(12) United States Patent
Shimamoto et al.

(10) Patent No.: US 6,950,020 B2
(45) Date of Patent: Sep. 27, 2005

(54) SURVEILLANCE SYSTEM, METHOD OF REMOTELY CONTROLLING SENSOR APPARATUS, AND SURVEILLANCE REMOTE CONTROLLER

(75) Inventors: Hiroshi Shimamoto, Kanagawa-ken (JP); Masayuki Oyagi, Kyoto-fu (JP); Yoshiyuki Otsuki, Kanagawa-ken (JP)

(73) Assignee: Omron Corporation, Kyoto (JP)

( * ) Notice: Subject to any disclaimer, the term of this patent is extended or adjusted under 35 U.S.C. 154(b) by 81 days.

(21) Appl. No.: 10/446,861

(22) Filed: May 29, 2003

(65) Prior Publication Data

US 2003/0222787 A1 Dec. 4, 2003

(30) Foreign Application Priority Data

Jun. 3, 2002 (JP) ..................................... P.2002-161491

(51) Int. Cl.[7] ................................................. G08B 1/08
(52) U.S. Cl. .............................. 340/539.16; 340/425.5; 340/426.1; 340/426.13; 340/426.15; 340/426.16; 340/426.18; 340/539.11; 340/539.1
(58) Field of Search .......................... 340/539.16, 425.5, 340/426.1, 426.13, 426.15, 426.16, 426.18, 426.21, 539.11, 539.1

(56) References Cited

U.S. PATENT DOCUMENTS

| | | | | |
|---|---|---|---|---|
| 5,257,007 A | * | 10/1993 | Steil et al. ................ 340/539.3 |
| 5,382,943 A | * | 1/1995 | Tanaka ................... 340/539.22 |
| 5,898,391 A | * | 4/1999 | Jefferies et al. ............. 340/988 |
| 5,917,405 A | * | 6/1999 | Joao ....................... 340/426.17 |
| 5,933,080 A | * | 8/1999 | Nojima .................. 340/426.19 |
| 6,147,598 A | | 11/2000 | Murphy et al. |
| 6,166,627 A | * | 12/2000 | Reeley .................... 340/426.25 |
| 6,255,936 B1 | * | 7/2001 | Amato ....................... 340/7.5 |
| 6,337,621 B1 | * | 1/2002 | Ogino et al. ............. 340/425.5 |
| 6,587,040 B2 | * | 7/2003 | Seto ........................ 340/426.1 |
| 6,690,302 B1 | * | 2/2004 | Inomata ..................... 340/989 |
| 6,788,189 B2 | * | 9/2004 | Kikkawa et al. ......... 340/426.1 |
| 2001/0051863 A1 | | 12/2001 | Razavi et al. |

FOREIGN PATENT DOCUMENTS

WO  WO 01/56307 A2  8/2001

* cited by examiner

*Primary Examiner*—Daryl C Pope
(74) *Attorney, Agent, or Firm*—Dickstein Shapiro Morin & Oshinsky LLP

(57) ABSTRACT

A vehicle surveillance system includes a vehicle-installed sensor apparatus for transmitting by radio, sensor information acquired by a sensor, a communication adapter for receiving by radio the sensor information from the vehicle-installed sensor apparatus and transmitting the received sensor information onto a public network, and a surveillance server for receiving the sensor information from the communication adapter. The vehicle surveillance system further includes at least one portable surveillance remote for relaying transmission of the sensor information from the vehicle-installed sensor apparatus to the communication adapter.

20 Claims, 5 Drawing Sheets

SURVEILLANCE SYSTEM, METHOD OF REMOTELY CONTROLLING SENSOR APPARATUS, AND SURVEILLANCE REMOTE CONTROLLER

BACKGROUND OF THE INVENTION

1. Field of the Invention

The present invention relates to a surveillance system for placing a surveillance area under surveillance wherein sensor information acquired from the surveillance area by a sensor apparatus is transmitted by radio from the sensor apparatus to a communication adapter and then further transmitted from the communication adapter to a surveillance server through a public network. The invention also relates to a surveillance remote controller and a method of remotely controlling the sensor apparatus using the surveillance remote controller.

More particularly, the invention relates to a surveillance system for adopting a vehicle as a surveillance area, and a method of remotely controlling a sensor apparatus which detects the condition of the vehicle and a surveillance remote controller (hereinafter referred as surveillance remote) executing the method. Specifically, the invention relates to a surveillance system, a method of remotely controlling a sensor apparatus and a surveillance remote for making it possible to increase the range in which radio communications are possible from the aforementioned sensor apparatus.

2. Description of the Related Art

In recent years, damage of theft, mischief, vehicle break-ins, etc., of a vehicle parked in a parking lot has risen dramatically. Thus, a vehicle surveillance system for placing a vehicle under surveillance is of great interest.

A vehicle surveillance system for placing a vehicle under surveillance has been known wherein sensor information acquired by a sensor apparatus installed in the vehicle is transmitted to a surveillance server through a mobile communication system, such as a mobile phone system.

Also, a vehicle surveillance system has been known wherein radio communications are conducted between a vehicle-installed sensor apparatus and a surveillance remote. In this system, sensor information is transmitted from the vehicle-installed sensor apparatus to the surveillance remote, and then, based on this sensor information, an instruction, such as warning or removal of warning, is transmitted from the surveillance remote to the vehicle-installed sensor apparatus.

As for the vehicle surveillance system wherein sensor information is transmitted from the vehicle-installed sensor apparatus to the surveillance server through the mobile communication system, a mobile communication terminal such as a mobile phone terminal is required to be installed in each vehicle. Thus, the installation cost of the mobile phone terminal and the communication charge become necessary for each vehicle, resulting in an increase in costs of the surveillance system.

In contrast, a surveillance system is possible wherein communication adapters for communicating with a surveillance server through a public network are installed at proper places and short-range radio communications using a radio LAN (local area network), etc., are conducted between the communication adapter and the sensor apparatus installed in each vehicle. Such a surveillance system is suited for the case where a communication adapter is installed in a location where the user frequently parks his vehicle, so that the user places the parked vehicle under surveillance. For example, communication adapters are installed at a user's home and place of work, for placing the vehicle parked at a parking lot of the user's home or place of work under surveillance.

As for the surveillance system using the communication adapters, only one communication line may be used for a plurality of vehicles and thus the communication cost can be reduced. However, the range in which radio communications are possible from the vehicle-installed sensor apparatus is a radius of about several hundred meters of the vehicle-installed sensor apparatus and is narrower than the range in which radio communications are possible from the mobile phone terminal (a radius of about several kilometers of the mobile phone terminal). To circumvent this problem, it has been considered that the number of installed communication adapters can be increased for shortening the distance between the vehicle-installed sensor apparatus and the communication adapter so that the vehicle-installed sensor apparatus and the communication adapter can properly communicate with each other. However, this increases the installation cost, impairing the above-described communication cost reduction.

SUMMARY OF THE INVENTION

It is therefore an object of the invention to provide a surveillance system that makes it possible to increase the range in which radio communications are possible from a sensor apparatus, and a method of remotely controlling the sensor apparatus and a surveillance remote controller.

In order to accomplish the objects above, the following means are adopted. According to the present invention, there is provided a surveillance system comprising:

a sensor apparatus including a sensor, for transmitting by radio, sensor information acquired by the sensor;

a communication adapter for receiving by radio the sensor information from the sensor apparatus and transmitting the received sensor information onto a public network;

a surveillance server for receiving the sensor information from the communication adapter; and at least one portable information relay for relaying transmission of the sensor information from the sensor apparatus to the communication adapter.

According to this configuration, the information relay is portable. Therefore, if the user carries the information relay and leaves the position where the sensor apparatus exists, the range in which the sensor information can be transmitted by radio from the sensor apparatus becomes the range obtained by adding the range within a predetermined distance from the sensor apparatus and the range within a predetermined distance from the user carrying the information relay. Accordingly, the range in which radio communications are possible from the sensor apparatus can be increased. Consequently, the number of installed communication adapters need not be increased and therefore, the system can be implemented at low cost.

Particularly, if a plurality of users carry their respective information relays, the range in which the sensor information can be transmitted by radio from one sensor apparatus of one user becomes the range obtained by adding the range within the predetermined distance from the one sensor apparatus, the range within the predetermined distance from the one user, and further the range within the predetermined distance from each of the other users. Thus, the range in which the radio communications are possible from the sensor apparatus can be further increased. In addition, if the range within the predetermined distance from one user and the range within the predetermined distance from each of other users overlap, the number of transmission paths increase, so that more reliable radio communications can be conducted.

In the surveillance system of the present invention, the sensor apparatus, the at least one information relay, and the communication adapter may form a radio LAN (local area network).

According to this configuration, each of the sensor apparatus, the at least one information relay, and the communication adapter may include only a network interface (I/F) corresponding to the radio LAN as a communication I/F and need not include a different network I/F. Therefore, the circuit scale can be reduced and the apparatus and the machines can be miniaturized. Particularly, in the radio LAN, the transmission-possible range is about several hundred meters and thus application of the present invention is effective.

In the surveillance system of the present invention, the information relay may be a surveillance remote controller for providing the user with information based on the sensor information received by radio from the sensor apparatus and remotely controlling the sensor apparatus.

According to this configuration, the information relay provides the user with information based on the sensor information, whereby the user can recognize the condition of the surveillance area without the intervention of the surveillance server. Since the information relay remotely controls the sensor apparatus, the user can remotely control the sensor apparatus without the intervention of the surveillance server.

The surveillance remote controller includes a radio transmission section for remotely controlling the sensor apparatus. Therefore, if the surveillance remote controller transmits the sensor information received by radio from the sensor apparatus by the radio transmission section, it can function as an information relay without adding any new components, and an increase in the cost can be prevented.

Preferably, the sensor apparatus is a vehicle-installed sensor apparatus being attached to a vehicle for placing the vehicle under surveillance. In this case, the surveillance system of the present invention becomes a vehicle surveillance system for adopting the vehicle as the surveillance area and can place the parked vehicle under surveillance, for example.

According to the present invention, there is provided a method of remotely controlling a sensor apparatus, the method comprising:

receiving by radio, sensor information from the sensor apparatus;

providing at least one portable information relay with information based on the received sensor information;

transmitting by radio, control information for remotely controlling the sensor apparatus to the sensor apparatus; and transmitting by radio, the received sensor information.

Further, according to the present invention, there is provided a surveillance remote controller comprising:

a radio transmission section for receiving by radio, sensor information from a sensor apparatus, and transmitting by radio, control information for remotely controlling the sensor apparatus to the sensor apparatus; and a notification section for providing a user with information based on the received sensor information, wherein the radio transmission section transmits by radio, the received sensor information.

According to this configuration, if the user is at a distant location from the surveillance area, the user can recognize the condition of the surveillance area and remotely control the sensor apparatus as the user carries the surveillance remote controller.

Further, the surveillance remote controller transmits by radio the received sensor information and thus the range in which the sensor information can be transmitted by radio from the sensor apparatus becomes the range obtained by adding the range within a predetermined distance from the sensor apparatus and the range within a predetermined distance from the user carrying the information relay (surveillance remote controller). Therefore, the range in which the sensor information can be transmitted from the sensor apparatus can be increased.

The surveillance remote controller includes a radio transmission section for transmitting control information by radio. Therefore, if the surveillance remote controller transmits the sensor information received by radio from the sensor apparatus by the radio transmission section, the range in which the sensor information can be transmitted from the sensor apparatus can be increased without adding any new components.

In the method of remotely controlling the sensor apparatus of the present invention, radio transmission and reception of information are executed through a radio LAN.

In the surveillance remote controller of the-present invention, the radio transmission section has a network I/F corresponding to a radio LAN.

According to this configuration, a network is constructed, whereby a plurality of surveillance remote controllers and a plurality of sensor apparatus can be identified. Therefore, the identification number of each sensor apparatus is contained in the sensor information from the sensor apparatus, whereby the surveillance remote controller can receive by radio the sensor information from the sensor apparatus to be remotely controlled through another surveillance remote controller. Accordingly, if the surveillance remote controller is at a distance from the range in which radio communications are possible from the sensor apparatus to be remotely controlled, the sensor apparatus can be remotely controlled.

DETAILED DESCRIPTION OF THE INVENTION

[First Embodiment]

Figure 1:
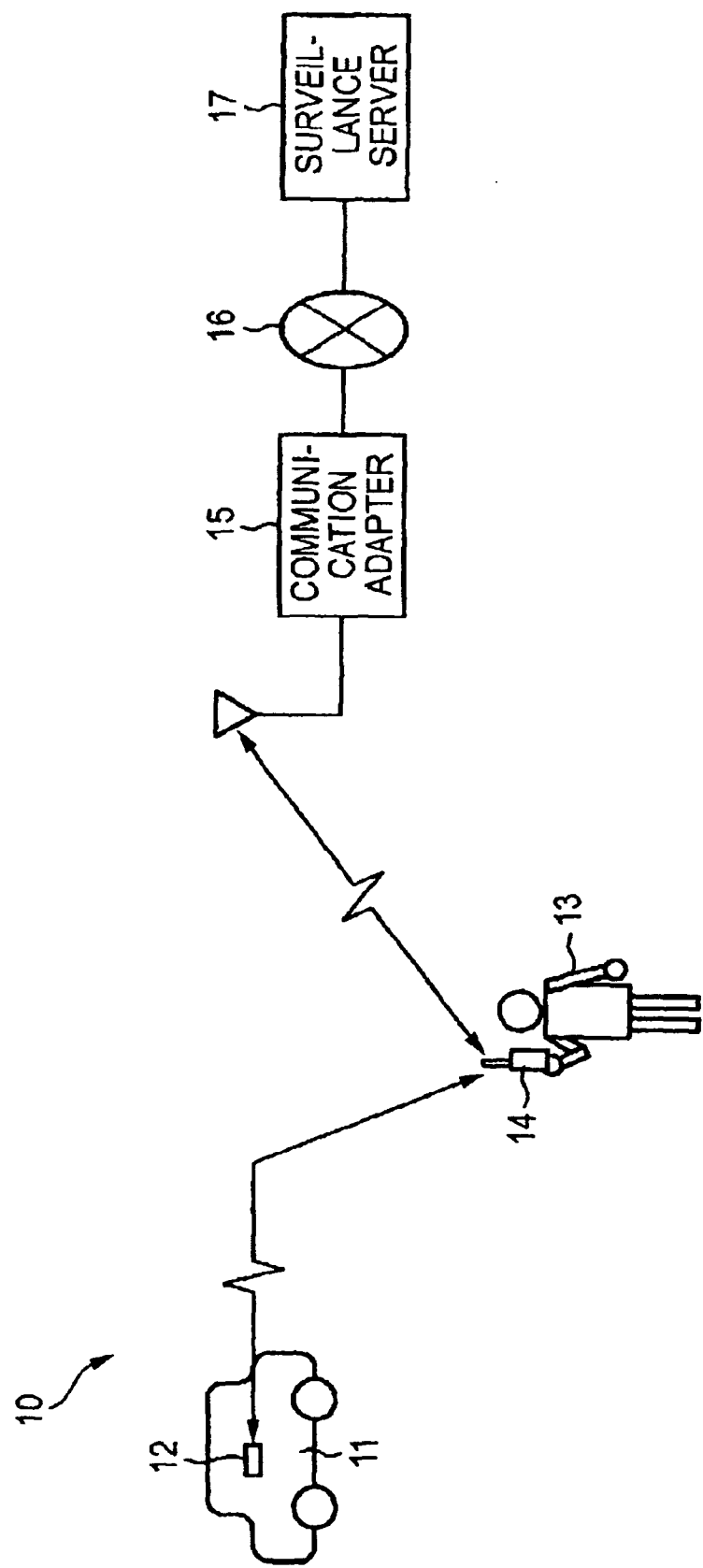
FIG. 1 is a block diagram showing a schematic configuration of a vehicle surveillance system according to a first embodiment of the invention.

A first embodiment of the present invention will be discussed with reference to FIGS. 1 to 5. FIG. 1 shows a vehicle surveillance system of the first embodiment of the present invention. A vehicle surveillance system 10 of the first embodiment is a system for placing a vehicle 11 under surveillance. The vehicle surveillance system 10 comprises a vehicle-installed sensor apparatus 12 installed in the vehicle 11, a surveillance remote controller 14 (hereinafter referred as a surveillance remote), a communication adapter 15, and a surveillance server 17. Sensor information acquired by the vehicle-installed sensor apparatus 12 is transmitted by radio from the vehicle-installed sensor apparatus 12 to the communication adapter 15 and then is transmitted from the communication adapter 15 to the surveillance server 17 through a public network 16. Particularly, in the vehicle surveillance system 10 of the first embodiment, radio communications between the vehicle-installed sensor apparatus 12 and the communication adapter 15 are conducted through the surveillance remote 14 carried by a user 13 as a relay.

Figure 2:
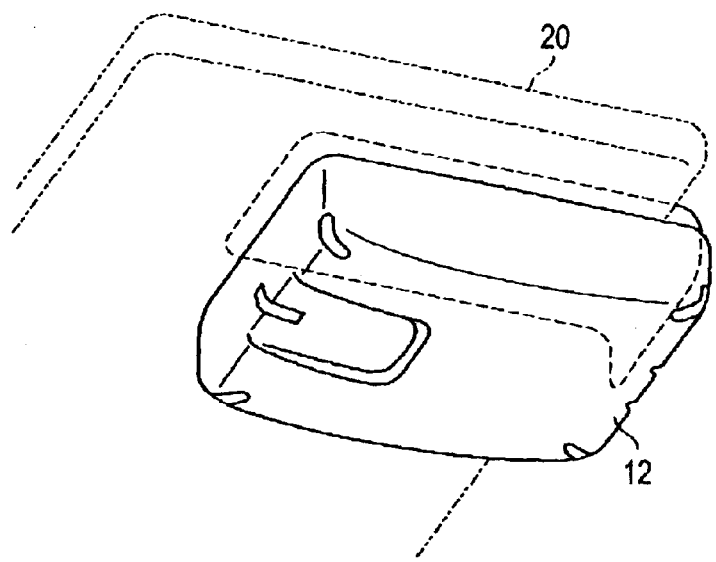
FIG. 2 is a perspective view showing a vehicle-installed sensor apparatus in the first embodiment of the invention.

FIG. 2 shows the vehicle-installed sensor apparatus 12 attached to a sun visor 20 of the vehicle 11. A sound pressure sensor (not shown) for detecting air vibration caused by sound or shock is placed in the vehicle-installed sensor apparatus 12. The vehicle-installed sensor apparatus 12 is an intelligent sensor for determining the presence or absence of a disturbance in the vehicle 11 and identifying the disturbance if it exists based on a sound pressure signal from the sound pressure sensor. For example, the vehicle-installed sensor apparatus 12 can detect a door being opened or closed or window glass being broken based on the sound pressure signal from the sound pressure sensor.

As sensors for placing the vehicle 11 under surveillance, in addition to the sound pressure sensor, various sensors can be used in response to the surveillance purpose. For example, to detect a door being opened or closed, a hit-and-run, damage to the car body with a coin, etc., a vibration sensor for detecting vibration and an acceleration sensor can be used. To detect, for example, the vehicle 11 being jacked-up or a wrecker moving the vehicle 11, a sensor for detecting tilt can be used. To detect the approach of a suspicious person, a radar can be used.

A radio LAN I/F section 30 (FIG. 4) for communicating with the surveillance remote 14 by radio (radio waves, etc.,) is placed in the vehicle-installed sensor apparatus 12. The radio communication-possible range of the radio LAN I/F section 30 varies depending on the type and output of the electromagnetic waves used for communications, the surrounding environment, etc.,; for example, to use about 10-mW (milliwatt) radio waves in a 400-MHz (megahertz) band, the range is within about 500 meters.

In this first embodiment, the vehicle-installed sensor apparatus 12 transmits disturbance information to the surveillance remote 14. The disturbance information includes occurrence of the disturbance, the disturbance type and level, the identification number of the vehicle-installed sensor apparatus 12, etc. In addition, the vehicle-installed sensor apparatus 12 transmits a warning of battery exhaustion, etc., to the surveillance remote 14.

To issue an alarm at the periphery of the vehicle 11 or intimidate a person breaking into the vehicle 11 using light and sound, the vehicle-installed sensor apparatus 12 may include an LED (light emitting diode) and a loudspeaker placed at proper points on the vehicle. An alarm is issued or the person breaking into the vehicle 11 may be intimidated based on instruction information received through the radio LAN I/F section 30 from the surveillance remote 14. Instead of the use of a loudspeaker, the vehicle-installed sensor apparatus 12 may be connected to the horn of the vehicle 11 for sounding the horn for issuing an alarm or intimidating the person breaking into the vehicle 11.

The vehicle-installed sensor apparatus 12 maybe provided with a secondary battery of a lithium ion battery, etc., for supplying power to various devices placed in the vehicle-installed sensor apparatus 12. It is desirable that the secondary battery can be recharged from a cigarette lighter socket of the vehicle 11.

Figure 3:
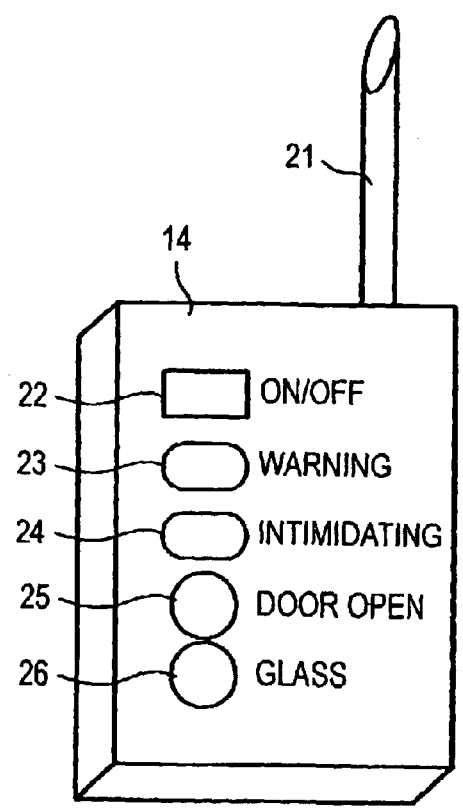
FIG. 3 is a perspective view showing a surveillance remote in the first embodiment of the invention.

FIG. 3 shows the surveillance remote 14 carried by the user 13. The surveillance remote 14 includes an antenna 21, a power switch 22, a warning button 23, an intimidating button 24, a door open notification LED 25, and a glass break notification LED 26. The antenna 21 is used for radio communications. The power switch 22 turns on and off power of the surveillance remote 14. The warning button 23 specifies whether or not the vehicle 11 is to be placed under surveillance. The intimidating button 24 specifies whether or not the vehicle-installed sensor apparatus 12 is caused to perform the above-described intimidating operation. The door open notification LED 25 notifies the user that a door of the vehicle 11 is open. The glass break notification LED 26 notifies the user that a window of the vehicle 11 is broken. The surveillance remote 14 contains a loudspeaker for indicating a disturbance of the vehicle 11 by a sound.

Figure 4:
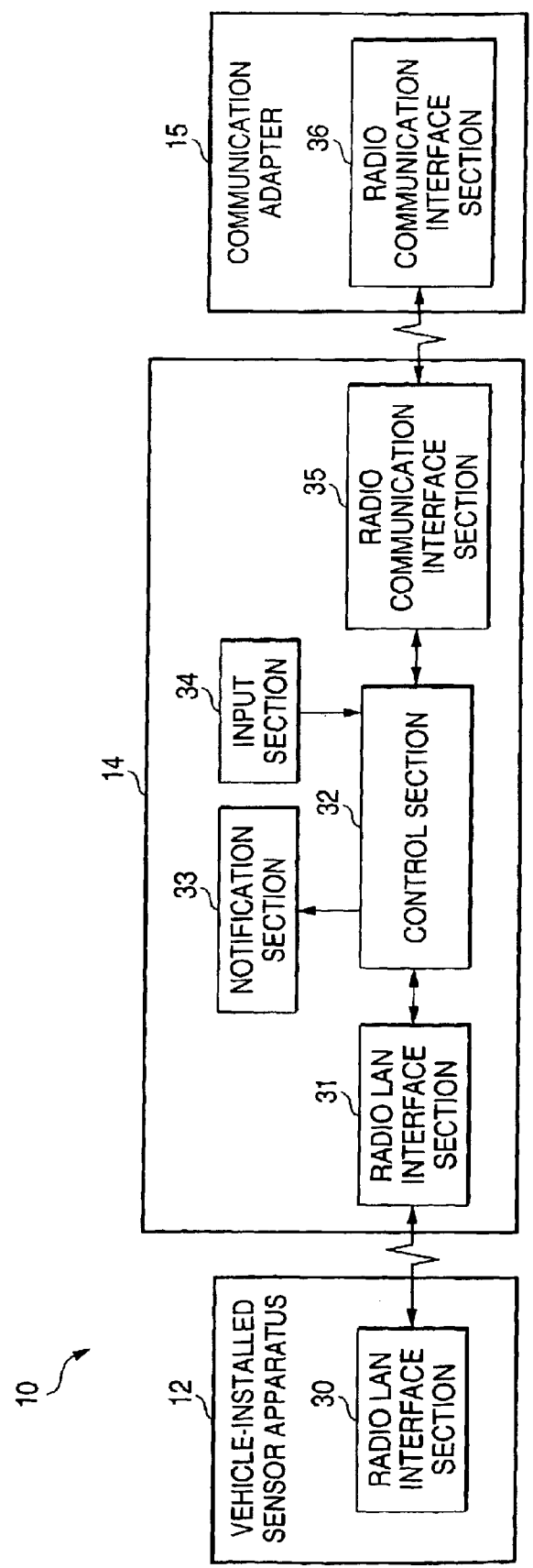
FIG. 4 is a block diagram showing a schematic configuration of the surveillance remote in the first embodiment of the invention.

FIG. 4 shows a schematic configuration of the surveillance remote 14. The surveillance remote 14 has a radio LAN I/F section 31, a control section 32, a notification section 33, an input section 34, and a radio communication I/F section 35. The components will be discussed below.

The radio LAN I/F section 31 conducts radio communications with the vehicle-installed sensor apparatus 12. The notification section 33 provides the user with various pieces of information; in the embodiment, the LEDs 25 and 26 and the loudspeaker correspond to the notification section 33, but a display, a voice output unit, a vibrator, etc., for example, can also be used.

The input section 34 accepts various entries from the user; in the embodiment, the power switch 22, the warning button 23, and the intimidating button 24 correspond to the input section 34, but any other input unit can be used. Next, the radio communication I/F section 35 conducts radio communications with the communication adapter 15.

The radio LAN I/F section 31, the notification section 33, the input section 34, and the radio communication I/F section 35 are controlled by the control section 32. The control section 32 receives disturbance information through the radio LAN I/F section 31 from the vehicle-installed sensor apparatus 12 and transmits instruction information for giving an instruction of warning or intimidation described above through the radio LAN I/F section 31 to the vehicle-installed sensor apparatus 12. The control section 32 also transmits the disturbance information received from the vehicle-installed sensor apparatus 12 through the radio communication I/F section 35 to the communication adapter 15.

As mentioned above, the disturbance information is also transmitted from the vehicle-installed sensor apparatus 12 to the surveillance remote 14 and further from the surveillance remote 14 to the communication adapter 15. Therefore, the range in which the disturbance information can be transmitted becomes the range obtained by adding the range in which the radio LAN I/F section 30 of the vehicle-installed sensor apparatus 12 can transmit the disturbance information and the range in which the radio communication I/F section 35 of the surveillance remote 14 can transmit the disturbance information. Thus, the range in which the disturbance information can be transmitted is increased.

Referring again to FIG. 1, the communication adapter 15 receives the disturbance information from the surveillance remote 14 and transmits the received disturbance information to the surveillance server 17 through the public network 16. As the public network 16, any desired public network such as the Internet and a public telephone network (including ISDN (Integrated Services Digital Network), PHS™ (Personal Handyphone System) (registered trademark), mobile phone system, etc.,) can be used singly or in combination.

Upon reception of the disturbance information of the vehicle 11 through the surveillance remote 14 and the communication adapter 15 from the vehicle-installed sensor apparatus 12, the surveillance server 17 records the disturbance information in a vehicle information database and reports the disturbance information to the persons concerned and to the police. The surveillance server 17 can also prepare warning or intimidation instruction information for the vehicle-installed sensor apparatus 12 and transmit the instruction information through the public network 16, the communication adapter 15, and the surveillance remote 14 to the vehicle-installed sensor apparatus 12.

The operation of the vehicle-installed sensor apparatus 12 and the operation of the surveillance remote 14 in the described vehicle surveillance system 10 are as follows. First, as the user 13 presses the warning button 23 of the surveillance remote 14, the surveillance remote 14 transmits warning instruction information to the vehicle-installed sensor apparatus 12, which then places the vehicle 11 under surveillance based on the instruction information.

Figure 5:
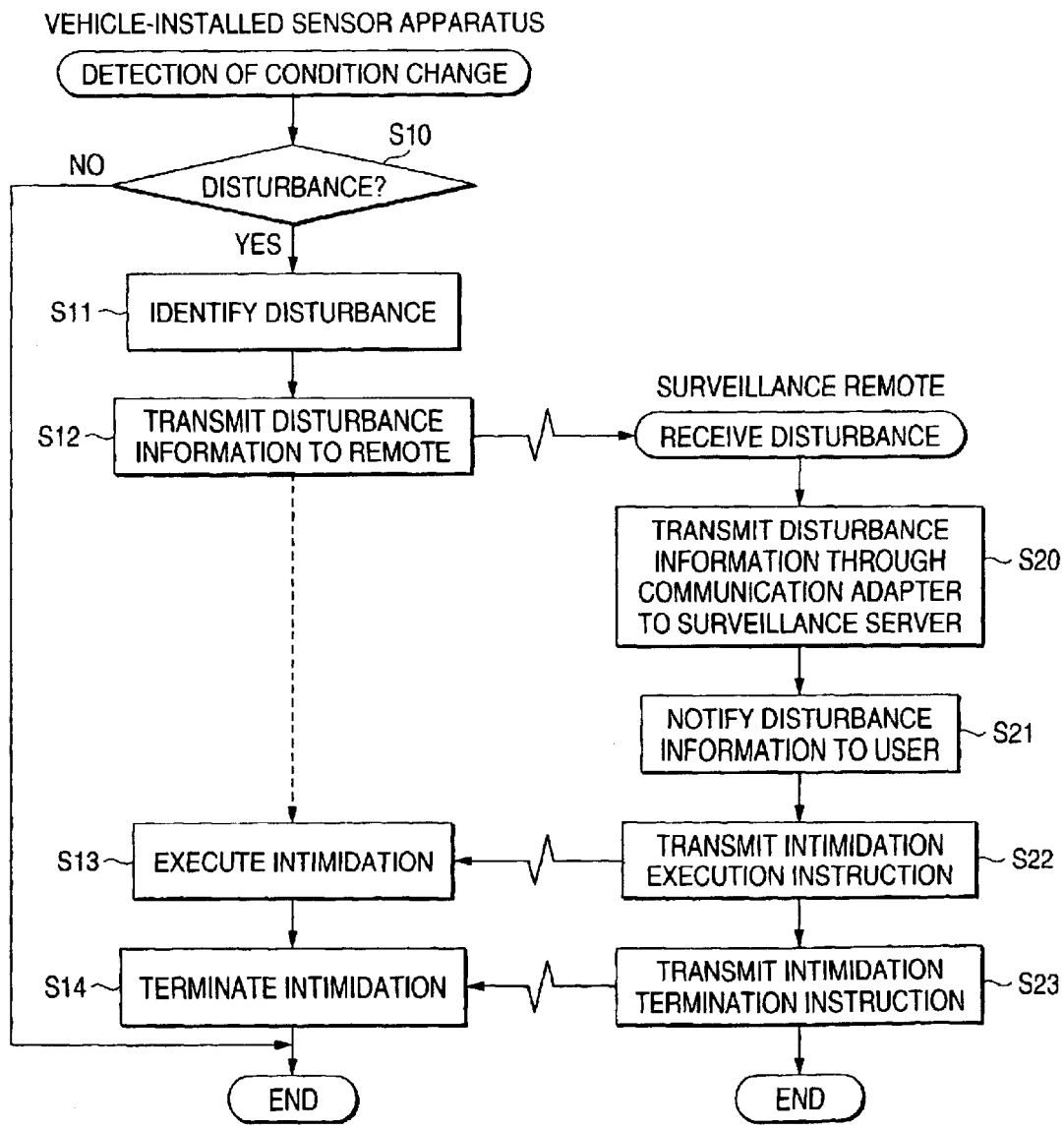
FIG. 5 is a flowchart showing the processing operation of the vehicle-installed sensor apparatus and the surveillance remote in the first embodiment of the invention.

FIG. 5 shows the processing operation of the vehicle-installed sensor apparatus 12 and the surveillance remote 14 when the vehicle-installed sensor apparatus 12 detects a condition change of the vehicle 11 placed under surveillance based on a detection signal from the sensor. First, from the detected condition change, the vehicle-installed sensor apparatus 12 determines whether or not a disturbance occurs (step S10). If the vehicle-installed sensor apparatus 12 determines that the disturbance does not occur, it terminates the processing operation started by the condition change detection.

On the other hand, if the vehicle-installed sensor apparatus 12 determines that the disturbance occurs, it identifies the disturbance type and level (step S11) and transmits by radio the disturbance information of the vehicle 11 including occurrence of the disturbance and the disturbance type and level to the surveillance remote 14 (step S12).

Upon reception of the disturbance information of the vehicle 11, the surveillance remote 14 transmits by radio the received disturbance information to the communication adapter 15. Then, the disturbance information of the vehicle 11 is transmitted through the communication adapter 15 and the public network 16 to the surveillance server 17 (step S20). At the same time, the notification section 33 provides the user 13 with the disturbance information (step S21).

Next, if the user 13 decides to start execution of intimidation and presses the intimidating button 24 of the surveillance remote 14, the surveillance remote 14 transmits intimidation execution instruction information to the vehicle-installed sensor apparatus 12 (step S22). Upon reception of the instruction information, the vehicle-installed sensor apparatus 12 uses the LED and the loudspeaker to flash light and sound a warning, thereby executing the intimidation (step S13).

Then, if the user 13 decides to terminate execution of intimidation and again presses the intimidating button 24 of the surveillance remote 14, the surveillance remote 14 transmits intimidation termination instruction information to the vehicle-installed sensor apparatus 12 (step S23). Upon reception of the instruction information, the vehicle-installed sensor apparatus 12 stops flashing and sounding the warning, thereby terminating the intimidation (step S14) and terminating the processing operation started by the condition change detection.

If the user 13 decides to cancel placing the vehicle 11 under surveillance and again presses the warning button 23 of the surveillance remote 14, the surveillance remote 14 transmits warning termination instruction information to the vehicle-installed sensor apparatus 12, which then terminates placing the vehicle 11 under surveillance based on the instruction information.

Therefore, in the vehicle surveillance system 10 of the first embodiment, the surveillance remote 14 functions as a relay of the disturbance information transmitted from the vehicle-installed sensor apparatus 12, so that the range in which the disturbance information can be transmitted from the vehicle-installed sensor apparatus 12 can be increased. Consequently, the number of installed communication adapters 15 need not be increased and therefore, communication cost can be minimized.

Since the notification section 33 of the surveillance remote 14, namely, the LED 25, the LED 26, the loudspeaker, etc., can notify the user of the disturbance information transmitted from the vehicle-installed sensor apparatus 12, the user 13 can recognize the disturbance of the vehicle 11 without the intervention of the surveillance server 17. When the user 13 enters an instruction given to the vehicle-installed sensor apparatus 12 by operating the input section 34 of the surveillance remote 14, namely, pressing the warning button 23 or the intimidating button 24, the vehicle-installed sensor apparatus 12 is remotely controlled based on the instruction. Thus, the user 13 can remotely control the vehicle-installed sensor apparatus 12 without the intervention of the surveillance server 17.

In the embodiment, the vehicle-installed sensor apparatus 12 determines the presence or absence of a disturbance and identifies the disturbance, but the surveillance remote 14 or the surveillance server 17 may determine the presence or absence of a disturbance and identify the disturbance. In this case, a detection signal from the sensor is transmitted by radio from the vehicle-installed sensor apparatus 12 as sensor information.

[Second Embodiment]

Figure 6:
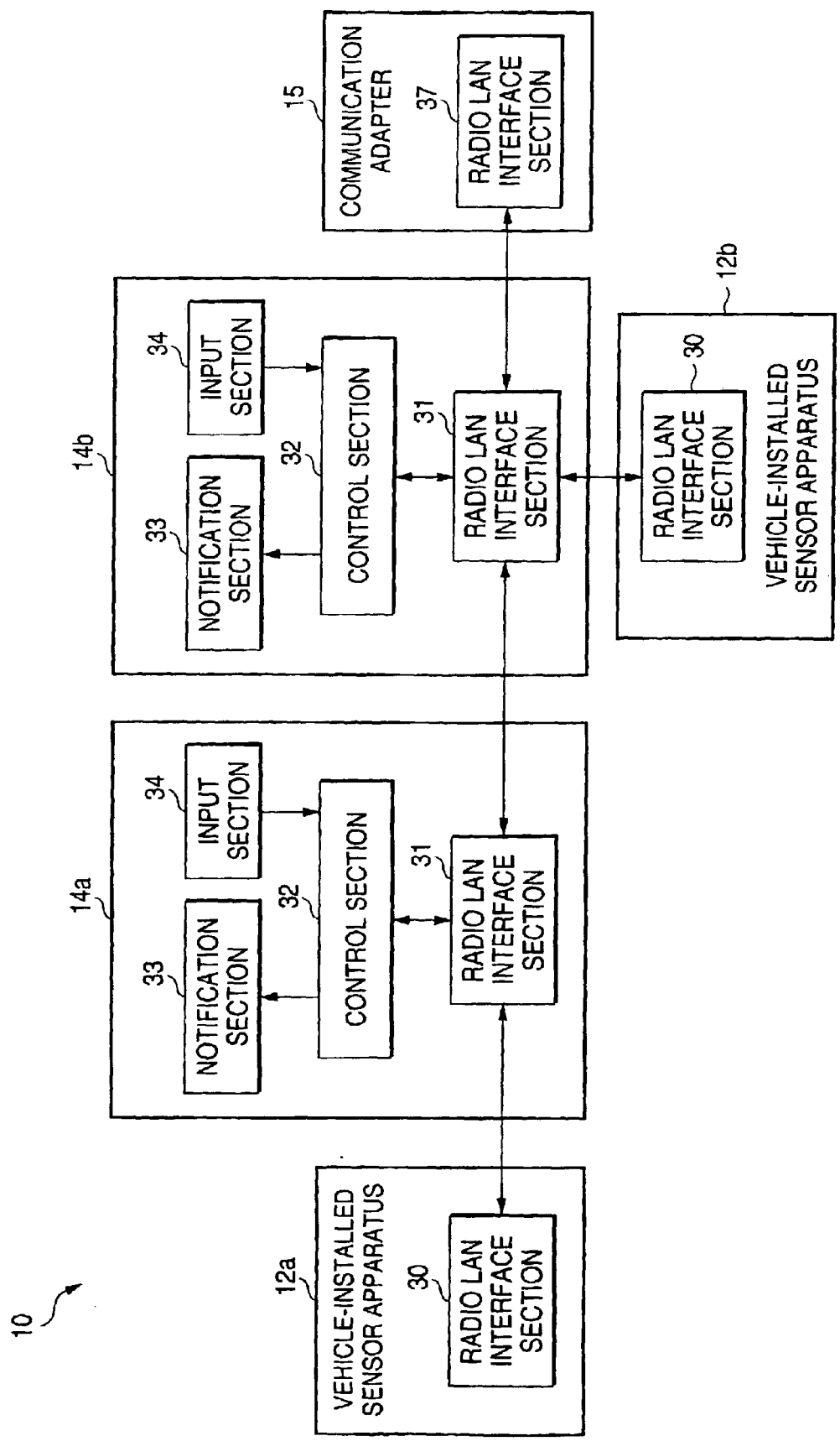
FIG. 6 is a block diagram showing a schematic configuration of a surveillance remote in a second embodiment of the invention.

Next, a second embodiment of the present invention will be discussed with reference to FIG. 6. A vehicle surveillance system of the second embodiment differs from the vehicle surveillance system 10 previously described with reference to FIGS. 1 to 5 only in that a plurality of surveillance remotes 14a and 14b are used and in that LAN I/F sections 30, 31, and 37 which are the same are used as communication I/F sections of vehicle-installed sensor apparatus 12a and 12b, the surveillance remotes 14a and 14b, and a communication adapter 15. Components similar to those previously described with reference to FIGS. 1 to 5 are denoted by the same reference numerals in FIG. 6.

The vehicle surveillance system of the second embodiment provides the following advantages in addition to the advantages of the vehicle surveillance system 10 of the first embodiment. In the second embodiment, disturbance information transmitted from the vehicle-installed sensor apparatus 12a is transmitted through the surveillance remotes 14a and 14b as relays to the communication adapter 15, so that the range in which the disturbance information can be transmitted from the vehicle-installed sensor apparatus 12a can be further increased. In addition, the range in which one surveillance remote 12a can transmit information and the range in which another surveillance remote 12b can transmit information overlap and thus more reliable radio communications can be conducted.

The same LAN I/F sections 30, 31, and 37 are used with the vehicle-installed sensor apparatus 12a and 12b, the surveillance remotes 14a and 14b, and the communication adapter 15. Therefore, if the communication adapter 15 exists in the range in which information can be transmitted from the vehicle-installed sensor apparatus 12a, disturbance information can be transmitted directly from the vehicle-installed sensor apparatus 12a to the communication adapter 15.

Further, although the surveillance remote 14a corresponding to the vehicle-installed sensor apparatus 12a does not exist in the range in which information can be transmitted from the vehicle-installed sensor apparatus 12a, if the different surveillance remote 14b exists in the range in which information can be transmitted from the vehicle-installed sensor apparatus 12a, disturbance information is transmitted by radio to the different surveillance remote 14b. Therefore, the disturbance information can be transmitted to the surveillance remote 14a through the surveillance remote 14b and can also be transmitted through the communication adapter 15 to a surveillance server 17.

The surveillance remote 14a, 14b may include only the network I/F corresponding to the radio LAN and need not include a different network I/F as compared with the surveillance remote 14 shown in FIG. 4. Therefore, sensor information from the sensor apparatus 12a, 12b can be relayed to the communication adapter 15 without adding any new components to the surveillance remote 14a, 14b. Accordingly, enlargement of the circuit scale can be prevented and upsizing of the apparatus and the machines can be prevented.

To use a plurality of surveillance remotes 14 . . . as in the second embodiment, a number of transmission paths from the sensor apparatus 12 to the communication adapter 15 maybe formed. Thus, it is desirable that the surveillance remotes 14 . . . should have a router function of selecting one of the communication paths (routing). Particularly, since the network topology changes at whatever time as the user 13 moves, it is desirable that dynamic routing should be performed.

In the embodiments, the vehicle surveillance systems for placing the vehicle 11 under surveillance have been described, but the present invention is not limited to placing the vehicle 11 under surveillance. The present invention can also be applied to various types of the surveillance, such as the surveillance of children playing in an open space of a park, a campground, etc., for example. As described above, As described above, the surveillance system of the present invention includes a sensor apparatus, a communication adapter, a surveillance server, and at least one portable information relay. The sensor apparatus transmits by radio, sensor information acquired by a sensor. The communication adapter receives by radio the sensor information from the sensor apparatus and transmits the received sensor information onto a public network. The surveillance server receives the sensor information from the communication adapter. The at least one portable information relay relays transmission of the sensor information from the sensor apparatus to the communication adapter.

Accordingly, as the user carries the information relay and leaves the position where the sensor apparatus exists, the range in which the sensor information can be transmitted by radio from the sensor apparatus becomes the range obtained by adding the range within a predetermined distance from the sensor apparatus and the range within a predetermined distance from the user carrying the information relay. Therefore, the surveillance system provides the advantage that the range in which radio communications are possible from the sensor apparatus can be increased. Particularly, if a plurality of users carry their respective information relays, the range in which the sensor information can be transmitted by radio from one sensor apparatus of one user becomes the range obtained by adding the range within the predetermined distance from the one sensor apparatus, the range within the predetermined distance from the one user, and further the range within the predetermined distance from each of other users. Thus, the range in which the radio communications are possible from the sensor apparatus can be further increased. In addition, if the range within the predetermined distance from one user and the range within the predetermined distance from each of other users overlap, the number of transmission paths increases, so that more reliable radio communications can be conducted.

The surveillance system of the present invention is a surveillance system wherein in the configuration, the sensor apparatus, the at least one information relay, and the communication adapter form a radio LAN.

Accordingly, each of the sensor apparatus, the at least one information relay, and the communication adapter may include only a network I/F corresponding to the radio LAN as a communication I/F and need not include a different network I/F. Therefore, the surveillance system provides the advantage that the circuit scale can be reduced and the apparatus and the machines can be miniaturized. Particularly, in the radio LAN, the transmission-possible range is about several hundred meters and thus, application of the present invention is effective.

The surveillance system of the present invention is a surveillance system wherein in the configuration, the information relay is a surveillance remote controller for providing the user with information based on the sensor information received by radio from the sensor apparatus and remotely controlling the sensor apparatus.

Accordingly, the surveillance system provides the advantage that the user can recognize the condition of the surveillance area without the intervention of the surveillance server and can control the sensor apparatus without the intervention of the surveillance server. If the surveillance remote controller transmits the sensor information received by radio from the sensor apparatus, it can function as an information relay without adding any new components, so that the surveillance system provides the advantage that an increase in the cost of the system can be prevented.

Preferably, the sensor apparatus is a vehicle-installed sensor apparatus being attached to a vehicle for placing the vehicle under surveillance. In this case, the surveillance system of the present invention becomes a vehicle surveillance system for adopting the vehicle as the surveillance area and can place the parked vehicle under surveillance, for example.

The method of remotely controlling a sensor apparatus of the present invention includes receiving by radio, sensor information from the sensor apparatus, providing at least one portable information relay with information based on the received sensor information, transmitting by radio, control information for remotely controlling the sensor apparatus to the sensor apparatus; and transmitting by radio, the received sensor information.

Further, the surveillance remote controller of the present invention includes a radio transmission section for receiving by radio, sensor information from a sensor apparatus, and transmitting by radio, control information for remotely controlling the sensor apparatus to the sensor apparatus, and a notification section for providing the user with information based on the received sensor information, wherein the radio transmission section transmits by radio, the received sensor information.

Accordingly, the surveillance remote controller provides the following advantages. If the user is at a distant location from the surveillance area, he or she can recognize the condition of the surveillance area and remotely control the sensor apparatus as the user carries the surveillance remote controller.

Further, the surveillance remote controller transmits by radio the received sensor information and thus can increase the range in which the sensor information can be transmitted from the sensor apparatus.

If the surveillance remote controller transmits the sensor information received by radio from the sensor apparatus without any processing, it can increase the range in which the sensor information can be transmitted from the sensor apparatus without adding any new components.

The method of remotely controlling the sensor apparatus of the present invention is a method of remotely controlling a sensor apparatus wherein in the configuration, radio transmission and reception of information are executed through a radio LAN.

The surveillance remote controller of the present invention is a surveillance remote controller wherein in the configuration, the radio transmission section has a network I/F corresponding to a radio LAN.

Accordingly, a plurality of surveillance remote controllers and a plurality of sensor apparatus can be identified, so that the surveillance remote controller can receive by radio the sensor information from the sensor apparatus to be remotely controlled through another surveillance remote controller. Therefore, if the surveillance remote controller is at a distance from the range in which radio communications are possible from the sensor apparatus to be remotely controlled, the sensor apparatus can be remotely

What is claimed is:

1. A surveillance system comprising:
   a sensor apparatus including a sensor, for transmitting by radio, sensor information acquired by the sensor;
   a communication adapter for receiving by radio the sensor information from said sensor apparatus and transmitting the received sensor information onto a public network;
   a surveillance server for receiving the sensor information from said communication adapter; and
   at least one portable information relay for relaying transmission of the sensor information from said sensor apparatus to said communication adapter wherein said at least one portable information relay does not include an image capture device.

2. The surveillance system as claimed in claim 1, wherein said sensor apparatus, said at least one information relay, and said communication adapter form a radio LAN.

3. The surveillance system as claimed in claim 1, wherein said information relay is a surveillance remote controller for providing a user with information based on the sensor information received by radio from said sensor apparatus and remotely controlling said sensor apparatus.

4. The surveillance system as claimed in claim 2, wherein said information relay is a surveillance remote controller for providing a user with information based on the sensor information received by radio from said sensor apparatus and remotely controlling said sensor apparatus.

5. The surveillance system as claimed in claim 1, wherein said sensor apparatus is a vehicle-installed sensor apparatus being attached to a vehicle for placing the vehicle under surveillance.

6. The surveillance system as claimed in claim 2, wherein said sensor apparatus is a vehicle-installed sensor apparatus being attached to a vehicle for placing the vehicle under surveillance.

7. The surveillance system as claimed in claim 3, wherein said sensor apparatus is a vehicle-installed sensor apparatus being attached to a vehicle for placing the vehicle under surveillance.

8. The surveillance system as claimed in claim 4, wherein said sensor apparatus is a vehicle-installed sensor apparatus being attached to a vehicle for placing the vehicle under surveillance.

9. The surveillance system of claim 1, wherein said at least one portable information relay does not include a motion detector and is held and used outside of a vehicle in which said sensor apparatus is installed.

10. A method of remotely controlling a sensor apparatus, the method comprising:
    receiving by radio, at at least one portable information relay, sensor information from the sensor apparatus, said sensor information not including information of a location of said sensor apparatus;
    providing said at least one portable information relay with information based on the received sensor information;
    transmitting by radio, from said at least one portable information relay, control information for remotely controlling the sensor apparatus; and
    transmitting by radio, from said at least one portable information relay, the received sensor information.

11. The method of remotely controlling a sensor apparatus as claimed in claim 10, wherein radio transmission and reception of information are executed through a radio LAN.

12. A surveillance remote controller comprising:
    a radio transmission section for receiving by radio, sensor information from a sensor apparatus, said sensor information not including information of a location of said sensor apparatus and transmitting by radio, control information for remotely controlling the sensor apparatus; and
    a notification section for providing a user with information based on the received sensor information,
    wherein the radio transmission section transmits by radio, the received sensor information.

13. The surveillance remote controller as claimed in claim 12, wherein said radio transmission section has a network I/F corresponding to a radio LAN.

14. A vehicle surveillance system, comprising:
    a vehicle-installed sensor apparatus including a sensor for transmitting, by radio, sensor information acquired by the sensor;
    at least one portable information relay for receiving, by radio, said sensor information and for transmitting, by radio, said sensor information, said at least one portable information relay not including an image capture device;
    a communication adapter for receiving, by radio, said sensor information from said portable information relay and for transmitting said received sensor information onto a public network; and a surveillance server for receiving said sensor information from said public network.

15. The system of claim 14, wherein said at least one portable information relay transmits instruction information to said vehicle-installed sensor apparatus.

16. The system of claim 15, wherein said instruction information comprises at least one of a warning signal and an intimidation signal.

17. The vehicle surveillance system of claim 14, wherein said at least one portable information relay does not include a motion detector and is held and used outside of a vehicle in which said sensor apparatus is installed.

18. A method for operating a vehicle surveillance system, the method comprising:

transmitting, by radio, sensor information acquired by a sensor of a vehicle-installed sensor apparatus, said sensor information not including information of a location of said vehicle;

receiving, by radio, at at least one portable information relay, said sensor information;

transmitting, by radio, from said at least one portable information relay, said sensor information;

receiving, by radio, at a communication adapter, said sensor information;

transmitting said sensor information from said communication adapter onto a public network; and receiving at a surveillance sensor said sensor information from said public network.

19. The method of claim 18 further comprising:

transmitting, from said at least one portable information relay, instruction information; and receiving said instruction information at said vehicle-installed sensor apparatus.

20. The method of claim 18 wherein said act of transmitting from said at least one portable information relay further comprises:

transmitting at least one of a warning signal and an intimidation signal.

* * * * *